Jan. 30, 1934.   C. H. NEHLS   1,944,945
HUB CAP AND LOCKING MEANS THEREFOR
Filed Sept. 18, 1933
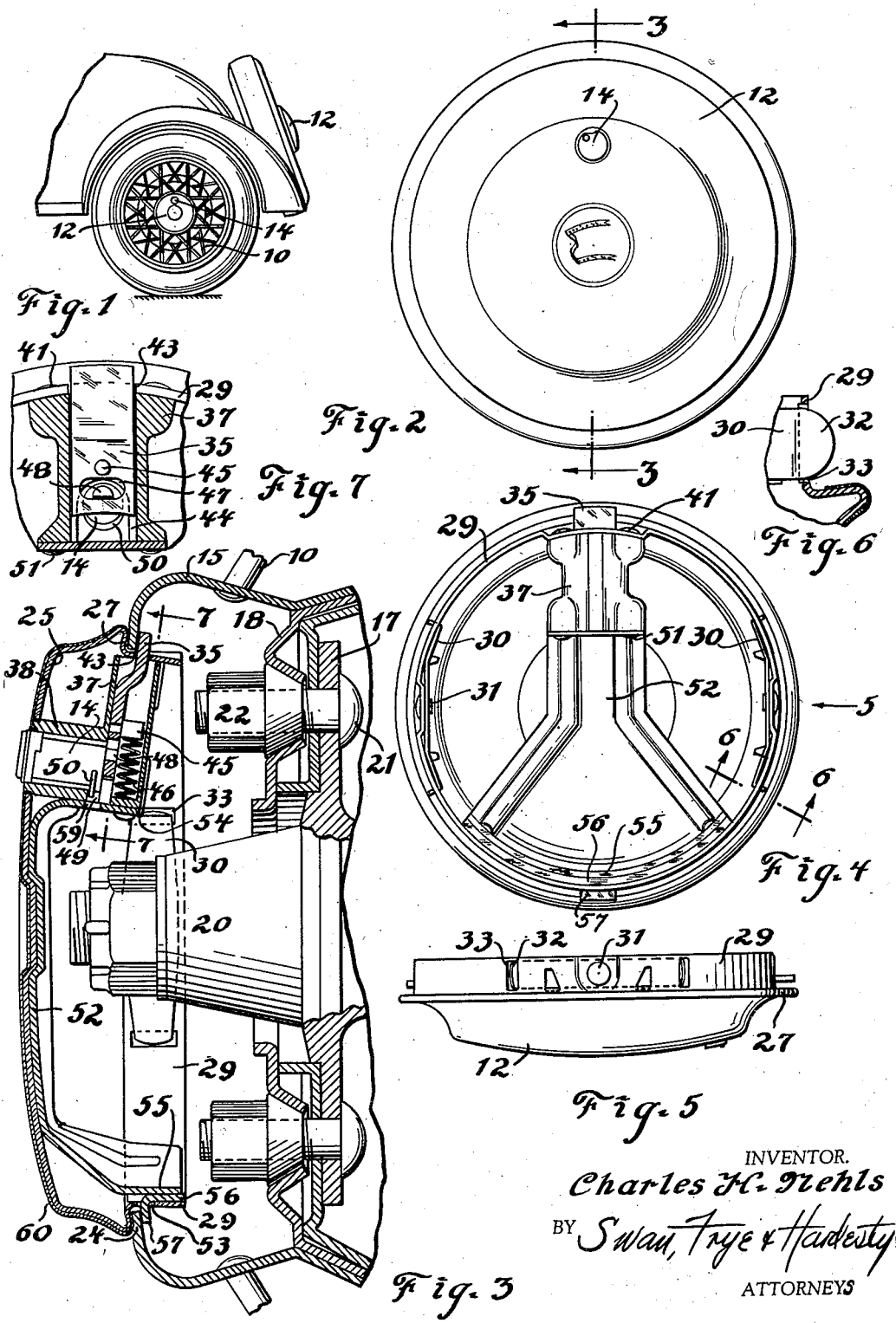
INVENTOR.
Charles H. Nehls
BY Swan, Frye & Hardesty
ATTORNEYS Patented Jan. 30, 1934

1,944,945

UNITED STATES PATENT OFFICE 1,944,945

HUB CAP AND LOCKING MEANS THEREFOR

Charles H. Nehls, Detroit, Mich., assignor, by mesne assignments, to Eaton Detroit Metal Company, Cleveland, Ohio, a corporation of Ohio Application September 18, 1933
Serial No. 689,851

8 Claims. (Cl. 70—90)

This invention relates to locking devices, and more particularly to improved locking means for securing a vehicle wheel or the like against undesired removal from an axle, spare wheel carrier, or other support.

An important object of the invention is the provision of an inexpensive and simplified locking hub cap construction selectively securable upon and detachable from the hub portion of a wheel in such manner that when in place it covers the securing means for, and so prevents removal of the wheel.

Another object of this invention is the provision of an improved locking mechanism, and of improved means for securing the same to a hub cap in such manner as to enable locking the hub upon a wheel.

A further important object is the incorporation in such a locking device of a tumbler lock or other equivalent reliable locking means arranged in a novel manner in a hub cap and offset from the center thereof to clear the axle of the wheel to which it is secured, together with the provision of novel counterbalancing means, also forming a support for the locking means and a reinforcement for the hub cap, for maintaining the balance of the hub cap and wheel.

Other objects and advantages will be apparent from the following description, wherein reference is made to the accompanying drawing illustrating a preferred embodiment of my invention and wherein similar reference numerals designate similar parts throughout the several views.

In the drawing:

Figure 1 is a fragmentary side elevation of the rear portion of a motor vehicle provided with demountable wheels mounted on an axle and spare wheel carrier, and locked in place by means of my improved locking hub caps.

Figure 2 is an enlarged front elevation of my hub cap.

Figure 3 is a vertical section, taken substantially on the line 3—3 of Figure 2 and looking in the direction of the arrows.

Figure 4 is a rear elevation of the hub cap, and

Figure 5 is a side view thereof, removed from the wheel.

Figure 6 is a detail section taken substantially on the line 6—6 of Figure 4 and looking in the direction of the arrows, and Figure 7 is a detail section taken substantially on the line 7—7 of Figure 3 and looking in the direction of the arrows.

Referring now to the drawing, and more particularly to Figures 1 and 3, in which a demountable wire wheel of a variety commonly used upon motor cars is shown and designated 10, my improved locking device will be seen to comprise generally a hub cap 12, together with means such as the tumbler lock 14 for locking the hub cap in place.

Wheels such as are ordinarily used upon motor cars of present day construction are virtually unitary in structure, the spokes being permanently secured at their inner ends to the wheel hub 15, which is demountably secured to and encloses an inner or master hub 17 carried by the axle, as 20, of the vehicle. The master hub is shown as comprising a flange supporting spaced wheel securing bolts 21 over which may be fitted the inwardly projecting annular flange portion 18, complementarily formed and perforated and rigidly carried by the wheel hub 15. Nuts, as 22, are adapted to be secured upon the ends of bolts 21 to secure the flange 18 and so the entire wheel in position upon the master hub. The nuts will be seen to be enclosed by the wheel hub, the cap opening in the hub being sufficiently large to permit manipulation of the nuts when the hub cap is removed. The cap opening is surrounded by an inwardly projecting flange portion of the hub 15 designated 24. The wheel parts thus far described will be recognized as conventional and might be of variant construction.

The hub cap is shown as comprising a stamped body portion 25 of sheet metal and generally cupped configuration, provided with a radially extending flange 27 adapted to seat against the flange 24 surrounding the cap opening in the hub 15, to position the cap. The inwardly projecting generally cylindrical inner rim portion 29 at the rear of the cap extends into the hub 15 and is but slightly smaller than the cap opening. The portion 29 carries spring detents 30, acting as friction retaining means to hold the cap in place. These are shown as leaf spring members, centrally secured, as by rivets 31, to the interior of the inwardly projecting portion 29 and lying close to the same, and provided with outwardly bent radially extending extremities 32 projecting through suitable slots, as 33, in the hub portion 29. The end portions 32 of the spring detent members may be rounded, as shown, and the springs so arranged that their resiliency tends to urge the portions 32 outwardly and through the slots 33 so that when the cap is in place they may extend behind the flange portion 24 of the hub 15 and so yieldably maintain the hub cap in position, although by reason of the rounded contour of the detents and their resiliency the cap may easily be pried off by means of a suitable tool, such as a screw driver,—when the cap is held in place only by such detents. Four detents are shown, arranged in integral pairs and diametrically opposed.

The exposed face of the cap may be sheathed as by means of the sheet metal covering member 60, which may be provided with any desired ornamentation, inscription and/or finish.

My preferred locking means includes a combined reinforcing, counterbalancing and lock casing supporting bracket member 52, fitted into and secured inside the cap body and generally conforming and lying close to the same. The main portion of the member 52 lies flush against the interior of the rear face of the cap, and is secured thereto in any suitable manner, as by welding, while one extremity thereof is turned inwardly away from the cap, as at 54, to support the lock casing 37, to which it is secured, as by drive screws 51. At its other extremity the bracket 52 is expanded in width to generally sectoral contour, and inwardly flanged, as at 55. The elongated flange portion lies inside but is slightly spaced from the cylindrical inner rim portion 29 of the cap. In the space between the bracket flange 55 and the portion 29 of the cap is arranged a segmental combined counterweight and detent member 56, formed of relatively heavy strap metal and preferably rigidly secured, as by welding, to both the flange 55 and the cylindrical cap portion 29. An integral outwardly bent detent lug 57 is adapted to project through a slot 53 in the portion 29 provided for that purpose. The sectoral portion of the bracket 52, and the segmental strip 56, will be seen to be adapted to serve as a counterweight for the diametrically opposed locking means (presently to be described), and these parts are preferably so proportioned as to exactly counterbalance each other, and preserve the balance of the hub cap assembly (at substantially its center).

In the lock casing 37 is arranged a radially movable bolt member 35, projectible through the flange portion 29 in such manner that it may be extended behind and retracted to clear the flange portion 24, and key-operable means manipulatable from outside the cap is also provided for moving the bolt, such as the tumbler lock 14. The bolt is slidable in the casing 37, which may be of die cast or any suitable construction and preferably integrally provided with a sleeve like boss portion 38 adapted to journal and support the lock cylinder 14. The integral bolt-and-lock casing 37—38 is secured to the bracket and reinforcing member 52, as previously pointed out, and may be additionally supported within the hub in the manner best shown in Figures 3, 4 and 7; the portion 37 from which the bolt 35 extends terminating immediately inside the flange 29, and being preferably secured thereto, as by means of drive screws 41. A slot, as 43, is formed in the portion 29 in alignment with the bolt slideway 44 in the casing portion 37, to permit sliding movement of the bolt through and beyond the portion 29. The bolt 35 carries a spring abutment, shown as a rivet 45 having an elongated head, between which and the bottom of casing portion 37 is trapped a compression spring 46 which urges the bolt outwardly. The portion of the bolt abutting the rear end of the lock cylinder is also provided with a cam slot 47 within which is adapted to fit the operating member or cam 48 of the lock.

The lock housing portion 38 of the integral casing 37—38 projects into engagement with the front face of the hub cap body 25 and in alignment with a suitable aperture (undesignated) therein, through which, if desired, such casing portion may extend to abut against the rear face of the sheathing member 60. Such aperture in the face of the cap is of course of sufficient size to expose the front of the lock cylinder to permit convenient manipulation thereof by means of a suitable key (not shown). The details of construction of the lock cylinder, forming no part of this invention, need not be considered in detail. In conjunction with the manner in which the cylinder is retained in the casing portion 28, however, I preferably provide means for releasing the cylinder, from inside the cap, to permit removal of the cylinder when desired, as for replacement or repair. The cylinder retaining means comprises a detent 50 yieldably projected outwardly beyond the cylindrical exterior of the lock casing by suitable spring means (not shown), and adapted to engage behind the front face of a suitable slot, as 49, in the casing portion 38, in alignment with which slot an aperture, as 59, is formed in the portion 54 of the bracket member, through which aperture the lock retaining member 50 is accessible, so that by forcing it inwardly and clear of the slot 49 the lock cylinder is freed for removal.

It will be seen that in applying the cap, the bolt 35 is retracted to clear the flange 24, and the diametrically opposed lug 57 is hooked behind the flange, after which it is only necessary to push the cap into place and project the lock bolt 35 behind an opposite portion of the flange to firmly lock the cap in place. When the cap is to be removed, the bolt is of course retracted and that side of the cap nearest the lock pried or pulled out first, after which slight lifting of the cap removes the lug 57 from behind the hub flange 24 and permits complete removal of the cap.

By reason of this novel structure not only is a standard hub cap utilizable as a locking device by means of simple insertable reinforcing and counterbalanced mechanism, but the arrangement is such as to make possible an economical offset arrangement of the locking mechanism, which may project rearwardly farther than the extremity of the axle, thus reducing the height of the cap and saving material and expense, as well as enhancing its appearance.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a locking hub cap construction, a dished sheet metal cap member, a combined bracket, bracing and counterbalancing member formed of sheet metal secured inside and lying close to the cap and conforming generally to the configuration of its interior, said member extending generally diametrically of the cap, locking means secured to said bracket at one end, and counterbalancing means for the locking means at the other end of said member.

2. In a locking hub cap construction, a dished sheet metal cap member, a combined bracket, counterbalancing and bracing member formed of sheet metal secured inside and lying close to the interior of the cap and conforming generally to the configuration thereof, said member extending generally diametrically of the cap, locking means secured to said bracket at its one end and including a bolt member projectible radially from the cap, counterbalancing means for said locking means secured to said member adjacent its other end, and detaining means adapted to cooperate with said locking means carried by the same end of said member as the counterbalancing means, said detaining means being disposed substantially opposite said bolt member.

3. In a locking hub cap construction, a dished sheet metal member having a substantially cylindrical inwardly projecting portion adjacent its free edge, and combined locking and counterbalancing means for the cap including a bracket conforming generally to the contour of the interior of the cap and secured inside the same, and having a flange portion lying inside and adjacent said cylindrical portion, combined detaining and counterbalancing means abutting said flange and secured thereto and to said cylindrical portion, a detent portion projecting from said cylindrical portion appurtenant the flanged end of said bracket, a lock casing secured to the other end of said bracket and to said cylindrical portion diametrically opposite said detent portion, and a lock bolt slidably mounted in said lock casing and radially movable to project from said cylindrical portion.

4. In a locking hub cap construction, a dished sheet metal member having a substantially cylindrical inwardly projecting portion adjacent by its free edge, and combined locking and counterbalancing means for the cap including a bracket conforming generally to the contour of the interior of the cap and lying close to and secured inside the same, a flange portion carried by said bracket adjacent one extremity and lying inside and adjacent said cylindrical portion, said bracket portion extending generally diametrically of but not entirely across the interior of the cap, counterbalancing means affixed to said bracket at said flanged end, and a lock bolt casing affixed to said bracket at its other end, said lock bolt casing abutting said cylindrical portion at its opposite end and having an offset portion abutting the face of the cap, a lock bolt slidable in the casing and adapted to project from the said cylindrical portion when extended, and means including a lock operable from outside the cap and carried by said offset portion of the casing for moving the lock bolt.

5. In a locking hub cap construction, a dished sheet metal hub cap member having a substantially cylindrical projecting inner flange portion, locking, counterbalancing and bracing means for the cap including a sheet metal bracket member generally conforming to the configuration of and lying close to the interior of the cap and rigidly secured inside to and bracing the cap, said bracket extending generally diametrically of the cap but stopping short of said cylindrical portion at one end, locking means arranged inside the cap and secured to said end of the bracket and including a lock bolt projectable through said cylindrical portion and manipulatable from outside the cap, and counterbalancing means affixed to the other end of the bracket diametrically opposite locking means.

6. A locking hub cap comprising an ordinary dished hub cap, and insertable locking means therefor comprising a lock casing, a combination reinforcing and counterbalancing bracket arranged to support the lock casing at one extremity, and a counterbalancing strip fixed to the other end of the bracket, the bracket, lock casing and counterbalancing strip being secured to the hub cap when in position.

7. A locking hub cap comprising an ordinary dished hub cap and an insertible locking and counterbalancing assembly, comprising a lock-enclosing casing adapted to be secured to the hub cap adjacent its periphery, and a combination supporting and counterbalancing bracket adapted to be secured to the interior of the hub cap and supporting the inner extremity of the locking casing, the hub cap being provided with apertures to permit introduction of a key into the lock and to permit extension of the lock bolt beyond the periphery of the hub cap.

8. A locking hub cap comprising an ordinary dished hub cap and an insertible locking and counterbalancing assembly, comprising a lock-enclosing casing having an offset barrel portion and engaging the inner face of the hub cap at the forward end of the barrel portion and at the outer extremity of the casing, a combination supporting and counterbalancing bracket secured to the inner face of the hub cap and supporting the inner extremity of the lock casing, the hub cap being provided with apertures to permit introduction of a key into said barrel portion and to permit extension of the lock bolt beyond the periphery of the hub cap.

CHARLES H. NEHLS.